United States Patent [11] 3,585,393

[72] Inventor Michael A. Duguay
Berkeley Heights, N.J.
[21] Appl. No. 755,132
[22] Filed Aug. 26, 1968
[45] Patented June 15, 1971
[73] Assignee Bell Telephone Laboratories, Incorporated
Murray Hill, N.J.

[54] DISPLAY OF OPTICAL PULSES BY TAKING CONVOLUTION OF SUCH PULSES WITH A TRAIN OF SAMPLING PULSES IN A NON-LINEAR OPTICAL MEDIUM
7 Claims, 3 Drawing Figs.
[52] U.S. Cl. ................................................. 250/217,
250/199, 250/220, 324/120, 328/15, 328/186, 350/150
[51] Int. Cl. ........................................................ H01j 39/12
[50] Field of Search.......................................... 250/217,
220, 199; 350/150, 151; 328/150, 186, 151, 15; 324/120, 121

[56] References Cited
UNITED STATES PATENTS
3,229,212 1/1966 Rogers ........................ 328/15
3,248,655 4/1966 Kobbe et al.................. 328/186
OTHER REFERENCES
Weber et al., " Optical Mixing with Different Relative Polarizations of the Beams," JOURNAL OF APPLIED PHYSICS, Vol. 37, No. 4, Aug., 1966, pp. 3584— 86

*Primary Examiner*—James W. Lawrence
*Assistant Examiner*—Martin Abramson
*Attorneys*—R. J. Guenther and Arthur J. Torsiglieri ABSTRACT: Picosecond optical pulses of periodicity $T$ are displayed by generating the convolution of the optical pulses in a nonlinear optical medium (e.g., a KDP crystal) with a train of picosecond sampling pulses of periodicity $nT+\delta T$, where $n$ is a simple fraction and $\delta T$ is a small fraction of $T$. The output of the nonlinear medium is detected and displayed on a conventional oscilloscope. The oscilloscope trace is a sampled display of the optical pulses with picosecond resolution and time scale magnification ($T/\delta T+1$).

DISPLAY OF OPTICAL PULSES BY TAKING CONVOLUTION OF SUCH PULSES WITH A TRAIN OF SAMPLING PULSES IN A NON-LINEAR OPTICAL MEDIUM

BACKGROUND OF THE INVENTION

This invention relates to method and apparatus for the display of optical signals and more particularly to method and apparatus for the display of periodic optical pulses of duration in the order of picoseconds.

Recent developments in the laser art have made it possible to phase-lock the oscillating modes of a laser by any of several well-known techniques including synchronous modulation, stimulated Raman emission and Q-switching. The output of a phase-locked laser is an optical pulse train having a pulse repetition rate given by $c/2L$, where $c$ is the velocity of light and $L$ is the effective length of the active medium. More importantly, however, the pulse width of the pulses generated is typically in the picosecond range (i.e., $10^{-12}$ seconds).

In many instances it is desirable to display visually such a pulse train and to measure its pulse width and repetition rate. The enormous bandwidth required to detect and display such narrow pulses, however, is not available in the prior art. Typical prior art display apparatus comprises a solid state photodiode having about one hundred picosecond resolution used to convert an optical information signal to an electrical signal which is applied to an electronic sampling oscilloscope having typically about thirty picosecond resolution. When so used in combination, however, the larger resolution of the photodiode limits the response of the system and, without more, makes it impossible to detect pulses of duration shorter than the limiting resolution.

SUMMARY OF THE INVENTION

The present invention by method and apparatus which produces a convolution of an optical sampling signal and the optical information signal permits the display of picosecond optical pulses. It is especially noteworthy that the convolution apparatus and appropriate choice of the periodicity of the sampling signal produces a time scale magnification of the information signal and thereby permits its display utilizing a conventional diode and oscilloscope, but with picosecond resolution and high sensitivity.

In accordance with an illustrative embodiment of the present invention an optical signal display device for displaying optical information pulses of periodicity $T$ comprises a source of optical sampling pulses of periodicity $nT+\delta T$, where $n$ is a simple fraction (i.e., $n=m/k$; $n$ and $k$ being integers) and $\delta T$ is a small fraction of $T$. Means are provided for generating the convolution $Y_c(t)$ of the information and sampling pulses, the convolution being expressed mathematically by $$Y_c(t) = \int I_i(t) I_s(t) \, dt \quad (1)$$

where $I_i(t)$ and $I_s(t)$ are the instantaneous intensities (i.e., the square of the envelope of the optical electric field) of the information and sampling pulse waveforms respectively. The optical output of the convolution means is converted by a conventional photomultiplier (or other appropriate means well known in the art) into an electrical analog signal which is displayed on a conventional oscilloscope. The trace of the oscilloscope is a sampled display of the information pulses with time scale magnification $(T/\delta T+1)$ and, where the sampling pulses are of picosecond duration, of picosecond resolution.

In general, therefore, the method of time scale magnification of information pulses of periodicity $T$ comprises the steps of generating sampling pulses of periodicity $nT+\delta T$ and generating the convolution signal of the information and sampling pulses.

The convolution means comprises generally a nonlinear optical medium which performs the function described by equation (1) when the information and sampling pulses are made to be coincident within the medium, which might be for example a nonlinear optical crystal such as potassium dihydrogen phosphate (KDP) set at the phase matching angle for sum or difference frequency generation, a saturable dye of the type used to mode-lock lasers (e.g., Eastman Kodak 9740) in which the absorption of the sampling pulses would be monitored, or a two-photon fluorescent (TPF) medium of the type disclosed by M. A. Duguay et al. in copending application, Ser. No. 668,052, filed Sept. 15, 1967, and assigned to applicant's assignee. TPF media are characterized by a pair of optically connected energy levels and fluoresce only upon the absorption of two photons per quantum of fluorescent radiation. One photon per quantum of fluorescent radiation is supplied from each of the information and sampling pulses which are made to have different intensities and different frequencies but such that the sum of the frequencies corresponds to the energy separation between the optically connected levels. Fluorescence is produced only when the sampling and information pulses are coincident and overlap within the TPF medium. A typical TPF medium is a $5\times10^{12}$ molar solution of diphenyclopentadiene in tetrahydrofuran which fluoresces at $0.43\mu$. Other TPF media include pyrene and tetraphenylcyclopentadiene.

BRIEF DESCRIPTION OF THE DRAWINGS

The invention, together with with its various features and advantages, can be easily understood from the following more detailed description taken in conjunction with the accompanying drawings, in which.

DETAILED DESCRIPTION

Figure 1:
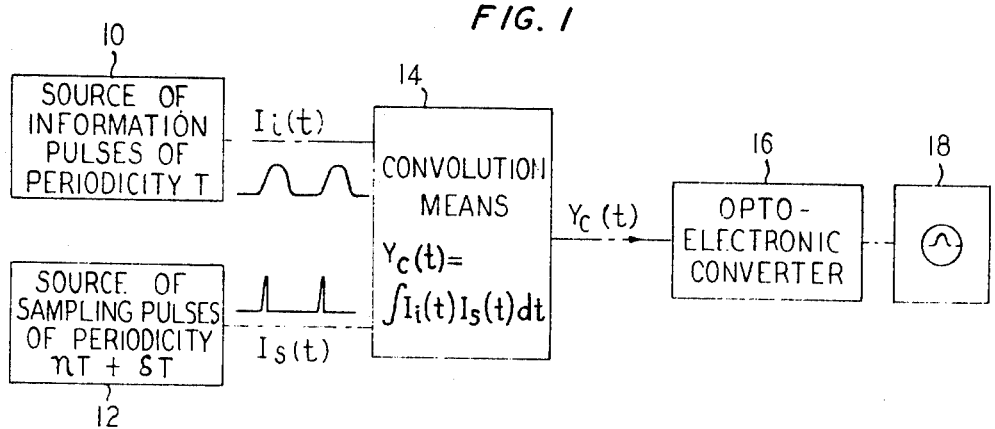
FIG. 1 is a block diagram of a general embodiment of the invention.

Turning now to FIG. 1, there is shown in accordance with an illustrative embodiment of the invention a block diagram of an optical signal display device comprising a source 10 of optical information pulses of periodicity $T$ to be displayed and source 12 of sampling pulses of periodicity $nT+\delta T$, where $n$ is a simple (i.e., i.e., $n=m/k$; $m$ and $k$ being integers) and $\delta T$ is a small fraction of $T$. Note, that if the information pulse occupies the entire period $T$, it would be desirable that $n=1$. The information and sampling pulses are directed into a convolution generator 14 which performs the function as defined by equation (1) and generates an optical output $Y_c(t)$, the time scale of which is magnified (by a factor of $(T/\delta T+)$) image of the information pulses. $Y_c(t)$ is converted by the optoelectronic converter 16 into an electrical analog signal which is applied to a conventional oscilloscope 18 or any other well-known visual display device.

Figure 2:
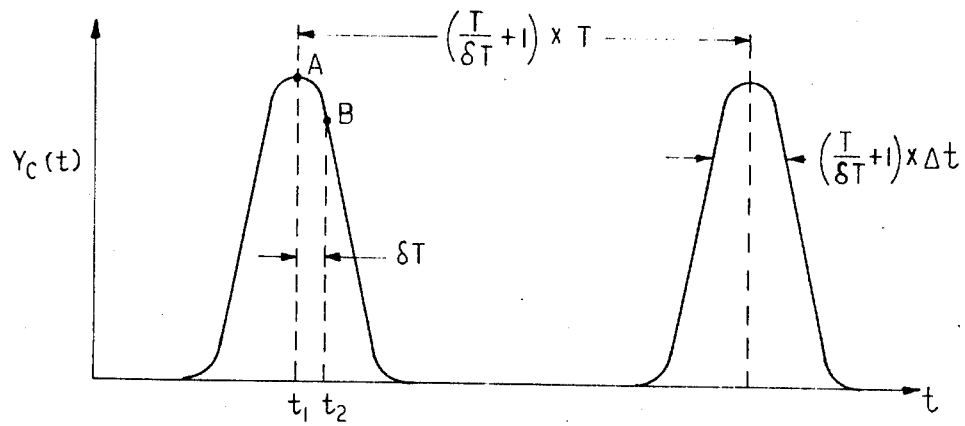
FIG. 2 is a graph of the information pulses with time scale magnification as they would appear on a conventional oscilloscope.

The operation of the display device, assuming for simplicity that $n=1$ and that the information pulses are of periodicity $T$ and pulse width $\Delta t$, is as follows. Suppose in FIG. 2 that at time $t_1$ the crests of the information and sampling pulses coincide in the convolution generator. Then $Y_c(t)$ is a maximum corresponding to point A. At a time $T+\delta T$ later the next subsequent sampling pulse samples the next subsequent information pulse at about $\delta T$ seconds behind the crest (i.e., at time $t_2$). Consequently, the information pulses are sampled in steps of $\delta T$ seconds, and since it takes $(T/\delta T+1)$ steps to scan the entire time interval $T$, the display of $Y_c(t)$ on a conventional oscilloscope is a sampled representation of the information pulses with its time scale magnified by a factor of $(T/\delta T+1)$. Typically, however, $T/\delta T \gg 1$ (e.g., $T/\delta T=1000$). $Y_c(t)$ is generally a plurality of narrow pulses whose peaks correspond to the amplitude waveform of the information pulses. By techniques well known in the art the optoelectronic converter 16 might include a peak detector or integrating circuit to convert the sampled form of $Y_c(t)$ into the envelope of the information pulses for display upon oscilloscope 18.

Figure 3:
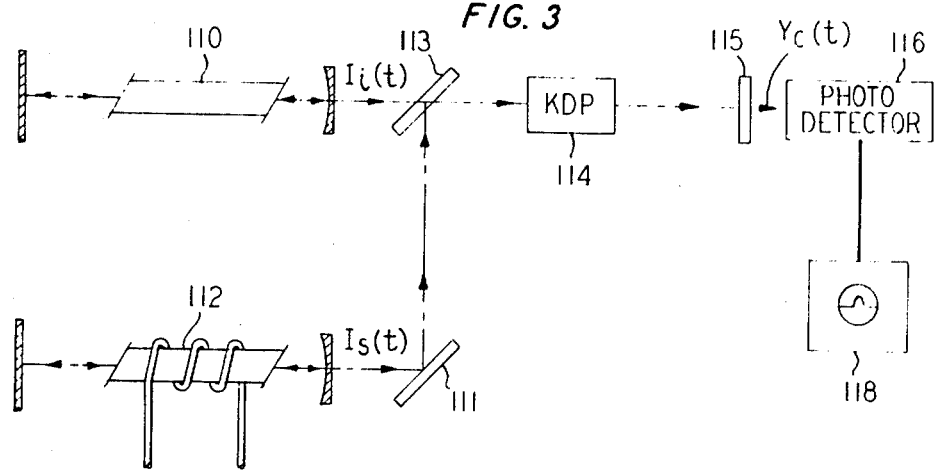
FIG. 3 is a block diagram of a more detailed illustrative embodiment of the invention.

In one embodiment as shown in FIG. 3 the optical signal display device comprises a He-Ne laser 110 mode locked by a neon cell (not shown; see Fox et al. *App. Phy. Let.* 12, 371 (1968)) To produce 300 psec. information pulses about 10 nsec. apart (2L/c locking) at 6328 A. The sampling pulses, about 4 psec. in duration and 10.01 nsec. apart, are generated at 1.06μ by a mode-locked CW Nd:YAG laser. L. M. Osterink et al. teach in *IEEE J-QE* 4, 252 (1968) the generation of 20 psec. pulses in a mode-locked Nd:YAG laser. Such pulses may be converted to 4 psec. pulses or less by a pulse compression scheme taught by J. A. Giordmaine et al. in Paper 17Q-8 of *IEEE J-QE* 4, 374 (1968). Thus, $\delta T$=.01 nsec. = 10 psec. and the magnification factor $(T/\delta T+1)$=1001. The sampling and information pulses are made, by means of reflector 111 and beam splitter 113, to enter colinearly into a KDP crystal set at the phase matching angle (i.e., 45° 35'; see H. P. Weber et al., *J. Appl. Phys.* 37 3584 (1966)) for sum frequency generation of the convolution signal $Y_c(t)$. The filter 115 passes $Y_c(t)$ which consists of 4 psec. ultraviolet pulses at 0.379μ, 10.01 nsec. apart. The envelope of these pulses corresponds to the information pulse waveform and is detected by a 56 UVP photomultiplier 116 (2.0 nsec. risetime) and displayed on a 565-type Tektronix oscilloscope 118 (2.5 nsec. risetime).

Both the efficiency and sensitivity of the above scheme are relatively high. With focused beams, the efficiency in converting part of the He-Ne laser pulse into UV light may be as high as 20 percent. In addition, since photomultipliers can detect single photons, it appears possible to sample optical signals with powers less than 1 milliwatt.

As pointed out previously, the convolution generator could comprise a saturable dye or a two-photon fluorescent medium as well as a nonlinear optic crystal.

In general, therefore, the method of time scale magnification of information pulses or periodicity T comprises the steps of generating sampling pulses of periodicity $nT+\delta T$ and generating the convolution signal of the information and sampling pulses.

It is to be understood that the above-described arrangements are merely illustrative of the many possible embodiments which can be devised to represent application of the principles of the invention. Numerous and varied other arrangements can be devised in accordance with these principles by those skilled in the art without departing from the spirit and scope of the invention.

What I claim is:

1. Apparatus having picosecond resolution for the time scale magnification of optical information pulses of periodicity $T$ comprising a source of optical sampling pulses of duration of the order of one picosecond and of periodicity $nT+\delta T$, where $n$ is a simple fraction and $\delta T$ is a small fraction of $T$, and
   means including a nonlinear optical medium for generating the optical convolution signal of the information and sampling pulses, the convolution signal being magnified in time scale by a factor of about $(T/\delta T+1)$, and
   means for causing said information and sampling pulses to overlap within said medium.

2. The apparatus of claim 1 wherein said source comprises a continuous wave Nd:YAG laser.

3. The apparatus of claim 1 wherein said convolutional signal generating means comprises a nonlinear optic crystal.

4. The apparatus of claim 1 wherein said convolutional signal generating means comprises a two-photon fluorescent medium characterized by a pair of optically connected energy levels, the information pulses being of one optical frequency and the sampling pulses being of another optical frequency such that the sum of the frequencies corresponds to the energy separation between said pair of energy levels.

5. The apparatus of claim 1 wherein said convolution signal generating means comprises a saturable dye.

6. The apparatus of claim 1 in combination with means for converting the optical convolution signal to an electrical analog signal and means for visually displaying the electrical signal.

7. The method of time scale magnifying optical information pulses of periodicity $T$ comprising the steps of
   generating optical sampling pulses of duration of the order of one picosecond and of periodicity $nT+\delta T$, where $n$ is a simple fraction and $\delta T$ is a small fraction of $T$, and
   said information and sampling pulses to overlap within a nonlinear optical medium which generates the optical convolution signal of the information and sampling pulses, the convolution signal being magnified in time scale by a factor of about $(T/\delta T+1)$.

UNITED STATES PATENT OFFICE
CERTIFICATE OF CORRECTION

Patent No. 3,585,393          Dated June 15, 1971

Inventor(s) Michael A. Duguay

It is certified that error appears in the above-identified patent and that said Letters Patent are hereby corrected as shown below:

Column 1, line 21, delete "$10^{112}$" and insert --$10^{-12}$--.

Column 1, line 52, before "Means" insert a period.

Column 2, line 21, delete "$10^{12}$" and insert --$10^{-2}$--.

Column 2, line 46, after "simple" insert --fraction--, delete first "i.e.,";

line 51, after "output" change "$Y_c(t)$" to --$Y_c(t)$--.

Column 3, line 37, after "pulses" delete "or" and insert --of--.

Column 4, line 35, delete second "T";

line 38, after last word "and" insert --causing--.

Signed and sealed this 5th day of December 1972.

(SEAL)
Attest:

EDWARD M. FLETCHER, JR.　　　　　　　　ROBERT GOTTSCHALK
Attesting Officer　　　　　　　　　　　　Commissioner of Patents